UNITED STATES PATENT OFFICE.

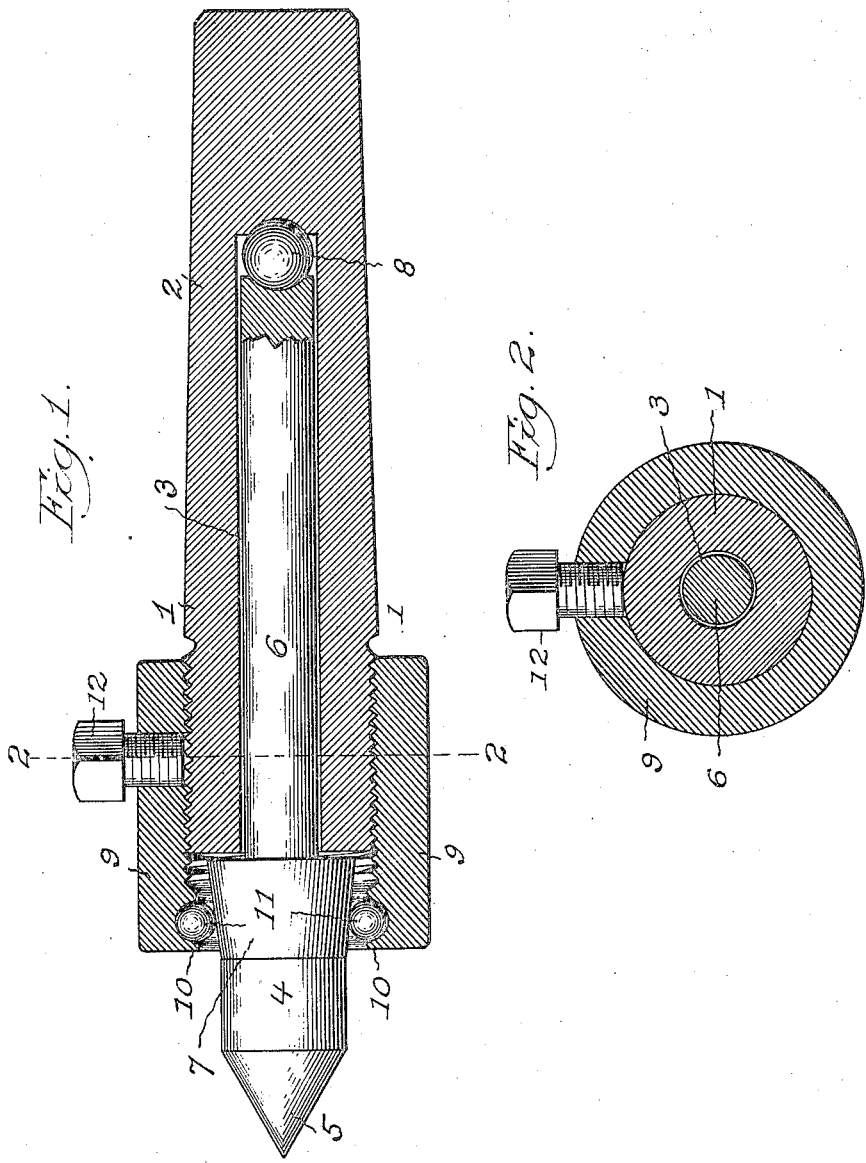

EUELL H. DAVIS AND RAYMOND D. BAKER, OF CHICAGO, ILLINOIS.

LATHE-CENTER.

1,400,731. Specification of Letters Patent. Patented Dec. 20, 1921.

Application filed June 14, 1920. Serial No. 388,908.

*To all whom it may concern:*

Be it known that we, EUELL H. DAVIS and RAYMOND D. BAKER, citizens of the United States of America, and residents of Chicago, in the county of Cook, State of Illinois, have invented certain new and useful Improvements in Lathe-Centers, of which the following is a specification.

This invention relates to that class of lathe centers in which the work engaging spindle is revoluble in its carrying stem, which in turn has a stationary fit in the arbor of the tail stock or like member of the lathe.

The object of the present improvement is to provide a simple and effective structural formation and combination of parts, whereby the work engaging spindle is revolubly mounted in its carrying stem in a manner adapted to reduce frictional resistance to a minimum, to take up wear due to continued use, and by means of which lateral as well as end movement of the spindle is prevented in an accurate and effective manner, all as will hereinafter more fully appear.

In the accompanying drawings:—

Figure 1, is a longitudinal sectional elevation of a lathe center embodying the preferred form of the present invention.

Fig. 2 is a transverse section on line 2—2 Fig. 1.

Like reference numerals indicate like parts in both views.

Referring to the drawing, 1 designates the carrying stem or body, the rear portion 2 of which is of the usual tapering form adapting the same to fit the tail stock of a lathe or like machine. The forward end of the stem or body 1 is externally screw-threaded for the adjustable attachment of the hereinafter described ball race cup or sleeve, and to such end is also formed with an axial bore or cavity 3 adapted to contain the rear shank of the work engaging spindle now to be described.

4 designates the work engaging spindle having the usual cone point 5 at its forward end and an extended cylindrical portion or shank 6, intermediate the length of which is formed a ball bearing portion 7 of a frustoconical shape the expansion of which is to the rear as shown, and which is adapted to coöperate with the ball race cup or sleeve heretofore referred to in an adjustment of parts to take up lost motion.

8 designates a ball or sphere interposed between the rear end of the shank 6 and the end wall of the axial bore 3 and having bearing in alined recesses in the parts. The ball 8 is adapted to receive the entire end thrust of the work engaging spindle 4 in actual use, and in the preferred construction shown in the drawing full clearance space is allowed between the bore 3 and the shank 6 aforesaid.

9 designates the ball race cap or sleeve heretofore referred to, of a cylindrical shell form and provided at its forward end with an inturned annular flange 10 formed as a ball race and adapted in conjunction with a series of balls 11 or the like, and the ball bearing cone 7 aforesaid, to constitute the bearing between the parts which bear all the lateral thrust on the lathe center in actual use. The rear portion of the cap or sleeve 9 is internally screw-threaded and fits the screw-threaded forward end of the carrying stem or body 1, and by a turning adjustment thereon is adapted to move the series of balls 11 upon the bearing cone 7 to attain the required close bearing fit of the parts.

12 designates a set screw passing through the cap or sleeve 9 for the purpose of locking the same in place after an adjustment.

Having thus fully described our said invention what we claim as new and desire to secure by Letters Patent, is:—

1. A lathe center comprising, a carrying stem formed with an axial bore, a work engaging spindle having a shank portion extending into said bore and a ball bearing portion intermediate its length and of a frustoconical form the expansion of which is rearward, a ball race member associated with the forward end of the carrying stem, a series of interposed rolling members, and means for adjusting said ball race member in relation to said carrying stem, substantially as set forth.

2. A lathe center comprising, a carrying stem formed with an axial bore, a work engaging spindle having a shank portion extending into said bore and a ball bearing portion intermediate its length and of a frustoconical form the expansion of which is rearward, a ball race member associated with the forward end of the carrying stem, a series of interposed balls, means for adjusting said ball race member in relation to said carrying stem, and an axially arranged ball disposed between the inner end of the work engaging spindle and the opposed wall of the bore of the carrying stem and bearing in opposed recesses in said parts, substantially as set forth.

3. A lathe center comprising, a carrying stem formed with an axial bore, a work engaging spindle having a shank portion extending into said bore and a ball bearing portion intermediate its length and of a frustoconical form the expansion of which is rearward, a sleeve screwing upon the forward end of the carrying stem and provided at its forward end with an annular ball race flange, and a series of balls interposed between said ball race flange and the bearing cone aforesaid, substantially as set forth.

4. A lathe center comprising, a carrying stem formed with an axial bore, a work engaging spindle having a shank portion extending into said bore and a ball bearing portion intermediate its length and of a frustoconical form the expansion of which is rearward, a sleeve screwing upon the forward end of the carrying stem and provided at its forward end with an annular ball race flange, a series of balls interposed between said ball race flange and the bearing cone aforesaid, and an axially arranged ball disposed between the inner end of the work engaging spindle and the opposed wall of the bore of the carrying stem and bearing in opposed recesses in said parts, substantially as set forth.

Signed at Chicago, Illinois, this 12th day of June, 1920.

EUELL H. DAVIS.
RAYMOND D. BAKER.